United States Patent [19]

Razzell

[11] Patent Number: 5,428,643
[45] Date of Patent: Jun. 27, 1995

[54] METHOD OF, AND TRANSMITTER FOR, TRANSMITTING A DIGITAL SIGNAL

[75] Inventor: Charles J. H. Razzell, Cambridge, England

[73] Assignee: U.S. Philips Corporation, New York, N.Y.

[21] Appl. No.: 98,694

[22] Filed: Jul. 28, 1993

[30] Foreign Application Priority Data

Aug. 25, 1992 [GB] United Kingdom ................. 9218009

[51] Int. Cl.6 ............................................ H04L 27/20
[52] U.S. Cl. ...................................... 375/308; 375/283; 375/261; 332/103; 371/37.8
[58] Field of Search ........................ 375/39, 44, 52, 53, 375/54, 56, 67; 332/103, 104; 371/37.8, 40.1, 43; 341/106

[56] References Cited

U.S. PATENT DOCUMENTS

| | | | |
|---|---|---|---|
| 4,358,853 | 11/1982 | Qureshi | 375/39 |
| 4,686,688 | 8/1987 | Chung et al. | 375/67 |
| 4,962,510 | 10/1990 | McDavid et al. | 375/96 |
| 5,140,613 | 8/1992 | Birgenheier et al. | 375/67 |
| 5,175,514 | 12/1992 | Linuma et al. | 375/53 |
| 5,311,553 | 5/1994 | Chennakeshu et al. | 375/67 |

FOREIGN PATENT DOCUMENTS

0132988 10/1989 European Pat. Off. .

*Primary Examiner*—Stephen Chin
*Assistant Examiner*—Don N. Vo
*Attorney, Agent, or Firm*—David R. Treacy

[57] ABSTRACT

A digital modulator in which symbols representing bits are encoded and assigned to respective points of constellation of points representing the modulation scheme. The quadrature components of a vector representing each of the constellation points are contained in a truth table (14) in which the columns comprise the respective constellation points and the rows comprise the relative in-phase and quadrature component values. In response to the assignment of a symbol to a constellation point the appropriate column in the truth table is read out in parallel as a binary word and the bits of the word are applied to respective first stages (S10) of a plurality of shift registers (SR1 to SR8) which store the histories of the respective component values for the previous (N-1) symbols. Outputs of each of the stages (S1 to S10) of each shift register are applied as an address to a look-up table (16) storing the filter response sequences to all combinations of N bits to obtain weighted filter response sequences representative of the particular combination of bits currently stored in the stages (S1 to S10) of each shift register (SR1 to SR8). The in-phase and quadrature phase weighted filter response sequences are combined and converted to analogue signals which are applied to a respective frequency up-conversion stage (18,20).

15 Claims, 4 Drawing Sheets

| 0 | 1 | 2 | 3 | 4 | 5 | 6 | 7 | |
|---|---|---|---|---|---|---|---|---|
| 1 | 0 | 0 | 0 | 0 | 0 | 0 | 0 | I = 1.0 — R1 |
| 0 | 0 | 0 | 0 | 1 | 0 | 0 | 0 | I = -1.0 — R2 |
| 0 | 1 | 0 | 0 | 0 | 0 | 0 | 1 | I = 0.7071 — R3 |
| 0 | 0 | 0 | 1 | 0 | 1 | 0 | 0 | I = -0.7071 — R4 |
| 0 | 0 | 1 | 0 | 0 | 0 | 0 | 0 | Q = 1.0 — R5 |
| 0 | 0 | 0 | 0 | 0 | 0 | 1 | 0 | Q = -1.0 — R6 |
| 0 | 1 | 0 | 1 | 0 | 0 | 0 | 0 | Q = 0.7071 — R7 |
| 0 | 0 | 0 | 0 | 0 | 1 | 0 | 1 | Q = -0.7071 — R8 |

METHOD OF, AND TRANSMITTER FOR, TRANSMITTING A DIGITAL SIGNAL

DESCRIPTION

The present invention relates to a method of, and transmitter for, transmitting a digital signal.

BACKGROUND OF THE INVENTION

When digitally synthesising a waveform various digital values are read out from a memory and are filtered to produce an analogue waveform which is transmitted through an air interface or through a landline, such as a co-axial cable or optical fibre.

An analogue filter for doing this task can be problematic and implementing the desired filtering characteristic using a digital filter is relatively costly and has limits on its operational speed due to the number of multiplications involved.

European Patent Specification EP 0 132 988 B1 discloses an implementation of a digital synthesis technique for a precisely controlled waveform having predetermined time and frequency characteristics in response to a binary input data stream. More particularly a truncated impulse response is stored and each transmission symbol provides a weighting for its component of the impulse response. Collectively each currently transmitted symbol is a function of the weighting assigned to its impulse function plus the weighting assigned to each neighbouring impulse function by the value of their respective transmission symbol states. Finally, the amount contributed from an impulse response of a neighbouring transmission symbol must take into account its temporal relationship, or time displacement, from the current transmission symbol. This patent specification discloses a number of embodiments of which a first, FIG. 1, relates to a 16 quadrature amplitude modulation signal using 4-level signals and a truncated sequence of 9 impulse responses which requires $4^9$ (or 262144) addressable memory locations. Another embodiment, FIG. 8, reduces this number of addressable memory locations by means of partial summations where each term is made up of the sum of three corresponding terms in some equations given. As a result each partial sum requires fewer addresses (hence less memory). In the example given six ROMs, each requiring 64 memory locations, accomplish the same memory function as two ROMs each requiring $2^9$ memory locations.

SUMMARY OF THE INVENTION

An object of the present invention is to reduce the number of memory locations.

According to one aspect of the present invention there is provided a method of transmitting data signals, comprising differentially encoding the data signals, mapping differentially encoded symbols on to filtering means using truth table means comprising columns representing each point on the differential encoding constellation and rows representing respective component values of the constellation vectors, each constellation point being represented by a binary value at the respective intersection of a column and row, storing the binary values corresponding to successive constellation points in shift register means, using the binary values relating to a succession of constellation points to obtain quadrature related weighted filter response sequences, providing analogue signals corresponding to the succession of weighted filter response sequences and frequency up converting the analogue signals.

In one embodiment of the method successive bits are encoded as symbols, the symbols are modulated and applied to digital filtering means having a desired characteristic for producing a filter response sequence in a form suitable for transmission, and the filter response sequences are converted to analogue signals for frequency up conversion for transmission, wherein the symbols are assigned to respective points of a modulation constellation using a truth table, the points of a modulation constellation being stored as in-phase and quadrature components of a vector defining each point, each column of the truth table relating to a respective point of the constellation and each row of the truth table representing one of a plurality of possible in-phase and quadrature component values, the component values of each constellation point being indicated by a binary value at the respective intersections of a particular column with the rows, wherein the digital filtering is effected in a digital filtering means comprising a plurality of shift register means corresponding in number to the number of rows in the truth table, each shift register means having a predetermined plurality of stages corresponding to the number of symbols, N, required by the filter spectrum, an input to each shift register means being connected to receive the binary value in a respective row of the truth table, outputs of the stages of each shift register forming the input address to a look-up table storing the filter response sequences for all combinations of N bits, wherein the sum of the weighted filter response sequences for all the in-phase components and for all the quadrature phase components are obtained, and wherein analogue values corresponding to the respective sums are applied to quadrature related frequency up conversion means.

According to a second aspect of the present invention there is provided a transmitter comprising means for differentially encoding the data signals, means for mapping differentially encoded symbols on to filtering means using truth table means comprising columns representing each point on the differential encoding constellation and rows representing respective component values of the constellation vectors, each constellation point being represented by a binary value at the respective intersection of a column and row, shift register means for storing the binary values corresponding to successive constellation points, means for using the binary values relating to a succession of constellation points to obtain quadrature related weighted filter response sequences, means for providing analogue signals corresponding to the succession of weighted filter response sequences and means for frequency up converting the analogue signals.

An embodiment of the transmitter comprises means for receiving a digital signal, means for encoding bits of the digital signal as symbols, modulation means comprising means for forming a truth table representing the components of vectors of a modulation constellation, the truth table comprising a plurality of columns, one for each constellation point, and a plurality of rows, each row being assigned a respective one of a plurality of possible in-phase and quadrature component values, the component values of each constellation point being indicated by a binary value at the respective intersection of a particular column with the rows, filtering means comprising a plurality of shift register means corresponding in number to the number of rows in the truth table, each shift register means having N stages for storing an output from a corresponding row of the truth table in response to the receipt of a symbol, at least one look-up table storing the filter response sequences for all combinations of N bits, outputs of each of the stages of each shift register means forming an address input to the look-up table, means for forming the sum of the weighted filter response sequences of all the in-phase components and of all the quadrature phase components, digital to analogue conversion means for converting the respective sums of the filtered weighted response signals to analogue signals and quadrature frequency up converting means for frequency up converting the analogue signals.

By means of the present invention the size of the look-up table is reduced significantly. Also any multiplications required in order to obtain the sums of the weighted in-phase and quadrature components involve binary "1"s and "0"s and can therefore be implemented easily.

The present invention will now be described, by way of example, with reference to the accompanying drawings.

BRIEF DESCRIPTION OF THE DRAWING

In the drawings the same reference numerals have been used to indicate corresponding features.

DESCRIPTION OF THE PREFERRED EMBODIMENT

Figure 1:
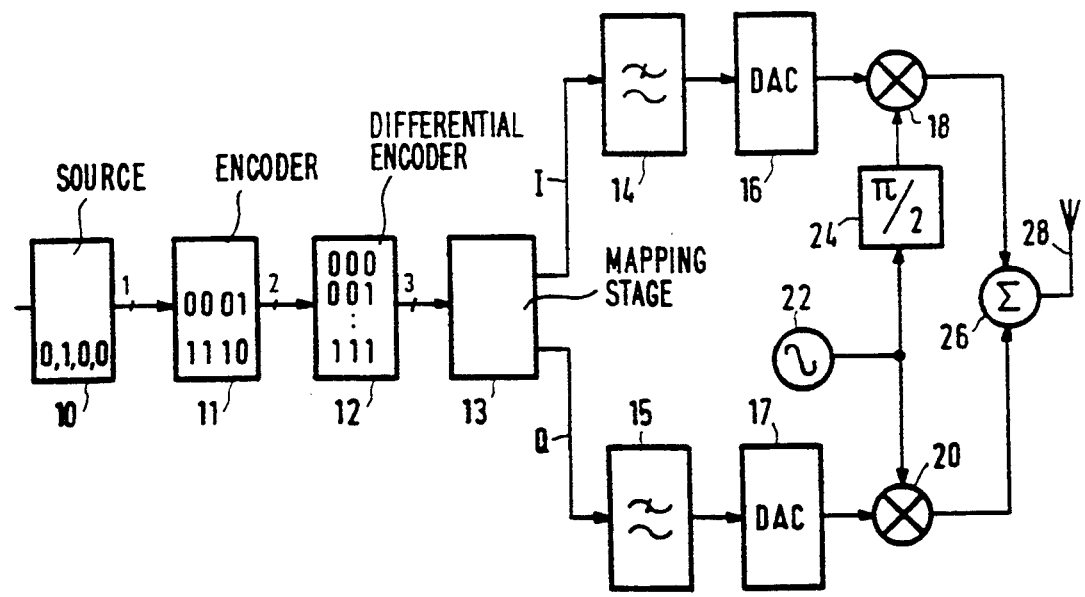
FIG. 1 is a block schematic diagram of a transmitter.

Referring to FIG. 1 a data signal comprising a succession of binary bits is produced by a source 10. The bits are suitably encoded as 2 bit symbols in an encoder 11. The symbols are applied to a differential encoder 12 in which they are encoded as $\pi/4$ DQPSK signals with suitable Gray code mapping in a stage 13. The operation of the encoder 12 will be described later. Quadrature related differentially encoded symbols I and Q are applied to raised cosine filters 14,15 which produce filter sequences which are applied to respective digital to analogue converters (DAC) 16,17 which may include reconstruction filters (not shown). Analogue outputs of the DACs 16,17 are applied to mixers 18,20 in which they are frequency up-converted using a local oscillator 22 and a $\pi/2$ phase shifter 24. The outputs of the mixers 18,20 are summed in a summation stage 26 and applied to an antenna 28 for transmission.

The operation of the differential encoder 12 and the mapping stage 13 will now be described with reference to FIG. 2. In the interests of clarity reference will be made to one form of Gray code mapping, however the invention can be implemented with other forms of Gray code mapping shown in the following table:

| Form | A | B | C | D | E | F | G | H |
|------|----|----|----|----|----|----|----|----|
| 00 | −3 | +3 | −1 | +1 | −3 | +3 | −1 | +1 |

-continued

| Form | A | B | C | D | E | F | G | H |
|------|----|----|----|----|----|----|----|----|
| 01 | +3 | −3 | +1 | −1 | −1 | +1 | −3 | +3 |
| 10 | −1 | +1 | −3 | −3 | +3 | −3 | +1 | −1 |
| 11 | +1 | −1 | +3 | +3 | +1 | −1 | +3 | −3 |

Figure 2:
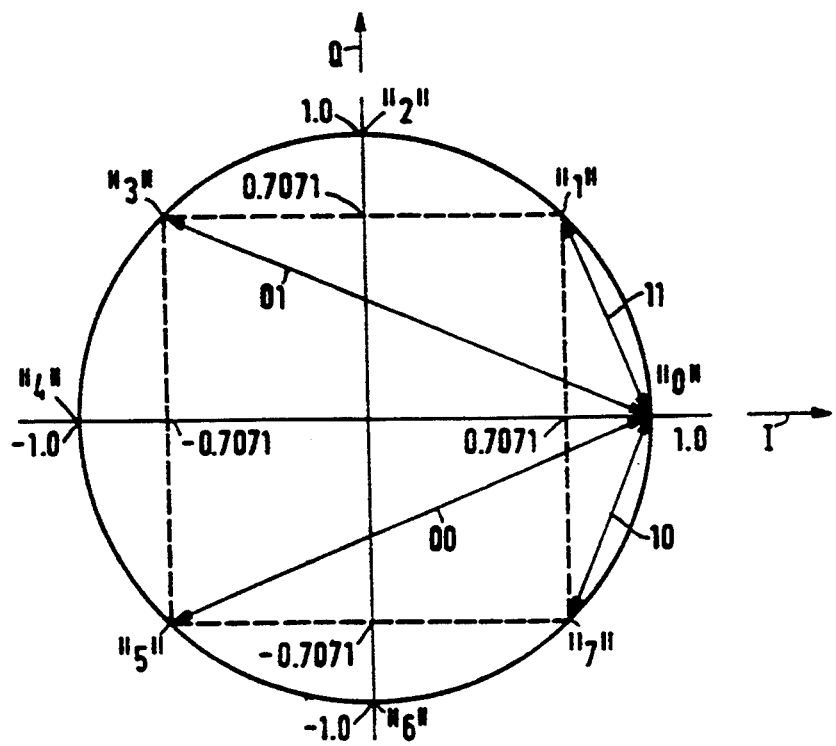
FIG. 2 is a vector diagram showing the constellation of points in a $\pi/4$ DPQSK modulation scheme.

The vector diagram shown in FIG. 2 indicates the 8 points of a $\pi/4$ DQPSK modulation scheme. The points are referenced "0" to "7". The Gray code mapping is in accordance with the form A in the above table. Starting at point "0" if the two bit symbol is equal to 00 then one adds −3 which means that you proceed 3 points in the clockwise direction to the point "5". If the two bit symbol is 01 then one adds +3 which means you proceed anticlockwise around the constellation by 3 points to point "3", taking "0" as a reference. Similarly, symbols 10 and 11 are differentially encoded by adding −1 and +1, respectively, which means you proceed to point "7" or "1", taking "0" as a reference. The modulation is indicated by the transition between two symbols.

Another point to note about the vector diagram is that by superimposing quadrature related axes I and Q on the diagram with the points "0" and "4" lying on the I-axis equidistant from the origin, the points "2" and "6" lying on the Q-axis equidistant from the origin and the distance from the origin in each case being unitary, the coordinates of each point of the constellation are as follows:

| Point | I | Q |
|-------|------|------|
| "0" | 1 | 0 |
| "1" | 0.7071 (or $\sqrt{0.5}$) | 0.7071 (or $\sqrt{0.5}$) |
| "2" | 0 | 1 |
| "3" | −0.7071 | 0.7071 |
| "4" | −1 | 0 |
| "5" | −0.7071 | −0.7071 |
| "6" | 0 | −1 |
| "7" | 0.7071 | −0.7071 |

Figures 3, 4:
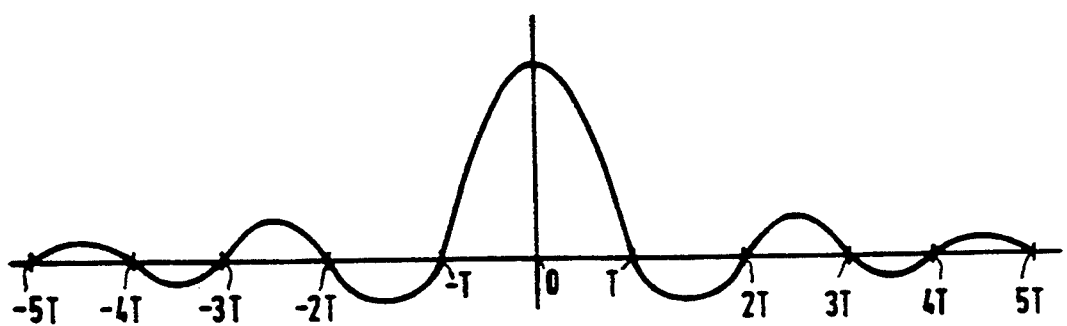
FIG. 3 is a truth table.
FIG. 4 is a diagram of part of the impulse response of a raised cosine filter.

FIG. 3 is a truth table in which the columns 0 to 7 refer to the constellation points "0" to "7" and the rows R1 to R8 relate to the relative value or weighting of I and Q. As an example if one refers to column 3 the I value is −0.7071 and the Q value is 0.7071. This truth table expressed in binary is and Os can be used to simplify the filters 14,15.

As is well known if one transmits a rectangular pulse, a wide frequency band is required because of the harmonics necessary to make up a rectangular pulse. In reality this is impractical because of the need to co-exist with neighbouring channels. To avoid adjacent channel interference a data signal is effectively filtered so that it can be transmitted and received without excessive interference to adjacent channels. FIG. 4 shows part of the impulse response of a raised cosine filter which is frequently used to transmit digital data signals in analogue form. The illustrated waveform extends over 10 symbol periods but the number of periods could be fewer or greater. One effect of it extending over 10 symbol periods is that the actual analogue values of the I and Q signals from the filter 16 are influenced by the preceding and following symbols. As a result when implementing such a filter as a look-up table, it has been necessary to store as analogue values, the histories of all combinations of N symbols, where N is the number of symbols used in the waveform of FIG. 4. For simplicity assume that N=10 and that each of the eight states (or points) of the constellation is represented by 3 bits. Therefore in order to store all the possible histories of 10 symbols will require $(2^3)^{10}$ bits (or $8^{10}$ bits) of storage.

The transmitter in accordance with the present invention reduces the required storage by making use of the truth table shown in FIG. 3 and in so doing the histories can be stored as filter response sequences to all combinations of N bits or binary values, as opposed to N symbols. As a result the number of memory locations is $2^{10}$, that is 1024. Depending on the implementation of the transmitter, the filter response sequence has to reflect the weighting applied to that row, see the right hand column in FIG. 3. The weighting may be taken into account in at least two ways, firstly to multiply the filter response sequence by the weighting as shown in FIG. 5 or to have eight ROMs in which the filter response sequences read-out have already been weighted as shown in FIG. 6.

In either case the contemporaneous weighted filtered response sequences for the I and Q components are summed, respectively, the sums are converted into analogue values in DACs 16,17 (FIG. 1) and are applied to the mixers 18,20.

Figure 5:
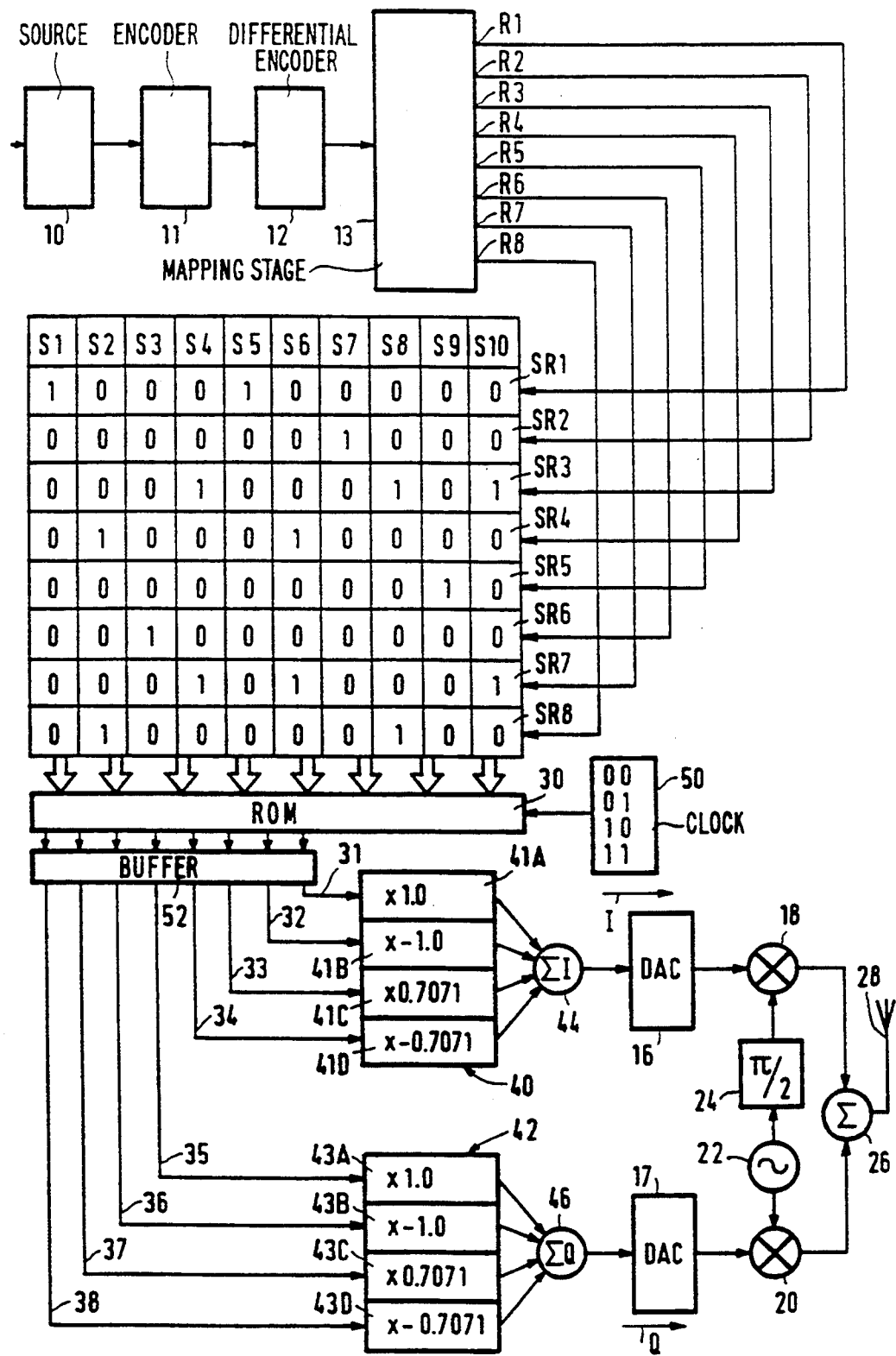
FIG. 5 is a block schematic diagram of one embodiment of the present invention.
Figure 6:
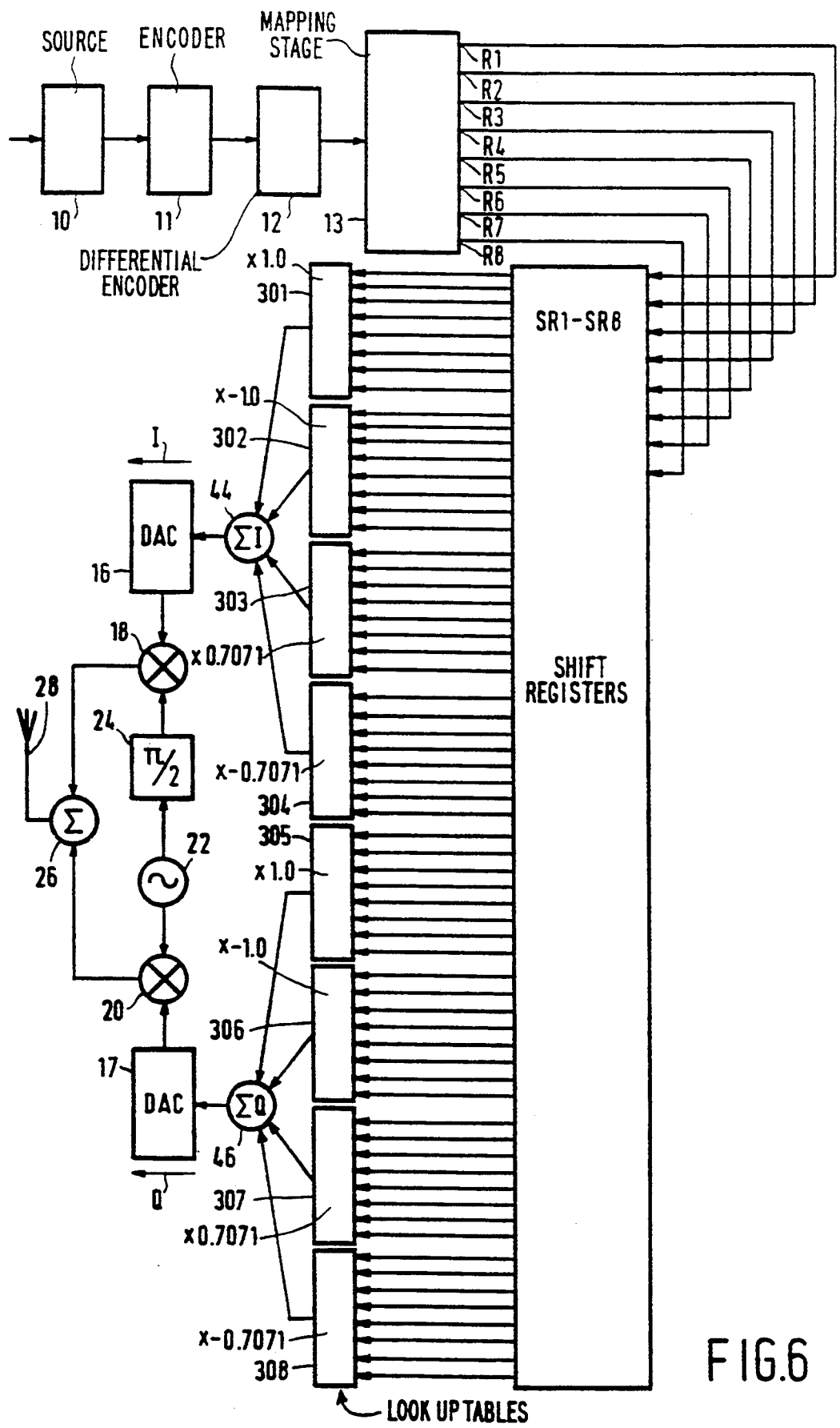
FIG. 6 is a block schematic diagram of another embodiment of the present invention.

Referring to FIG. 5, the mapping stage 13 comprises the truth table shown in FIG. 3. Each row R1 to R8 of the mapping stage 13 has an output coupled to a respective shift register SR1 to SR8, each of which stores a history of bits or binary values associated with that row. The number of stages in each shift register SR1 to SR8 corresponds to the value of N and for ease of illustration, 10 stages S1 to S10 are shown. Stage S1 holds the oldest entry and the stage S10 the newest. When the shift registers are indexed after each symbol period the oldest entry is dropped as the stages shift their contents to make room for the newest entry. The 10 bit outputs of each shift register SR1 to SR8 are sequentially applied during one symbol period to the ROM look-up table 30 which stores the filter response sequences to all the combinations of 10 bits.

Each filter response sequence comprises M-values, where M is an integer and has for example a value of 4. All M values of the addressed filter response sequences are read-out during a symbol period. The selected one of the M-values of the filter response sequences is determined by appending additional address bits to those constituted by the outputs of the shift registers SR1 to SR8. These additional bits, for example 00,01,10 and 11 are produced by a clock 50 connected to the ROM look-up table 30. Thus during a first sweep of the shift registers SR1 to SR8, the additional address bits, say 00, are appended to the respective addresses and the first of the M-values is read-out and stored in a timing buffer 52. At the end of the sweep, all the values are read-out simultaneously on respective output data paths 31 to 38. The outputs of the shift registers SR1 to SR8 are again swept and the additional address bits, say 01, are appended to each ROM address so that the second values of the filter response sequences are read out and held in the time buffer 52 prior to being read-out simultaneously on respective output data paths 31 to 38. The cycle is repeated for each of the other values.

For the purposes of illustration it has been assumed that the differentially encoded symbols correspond to the constellation points 0,5,6,1,0,3,4,7,2,1. Thus the first stage, S1, of the shift registers SR1 to SR8 store the binary values in the truth table for the constellation point "0", as shown. The binary values for the subsequent constellation points are stored in the respective stages S2 to S10 of the shift registers SR1 to SR8. During the subsequent symbol period and before a new symbol is clocked into the shift registers, each shift register SR1 to SR8 is considered in turn in a succession of sweeps. The 10 bit outputs of the 8 shift registers SR1 to SR8 are applied sequentially during one symbol period as addresses to the look-up table 30 which in turn gives one value of filter response sequence on the appropriate output data path. As an example the shift register SR4 contains binary values 0100010000 and these (together with the appended address bits) constitute the input address to the look-up table 30. The preselected value of the filter response sequence corresponding that address is read out and supplied to the timing buffer 52 from where the value is read out on data path 34.

The values of the filter response sequences obtained on the data paths 31 to 38 have to be weighted in accordance with the values applied respectively to the rows R1 to R8 of the truth table. This is done in respective multipliers 40,42 for the I and Q values. Each multiplier 40,42 comprises 4 stages 41A to 41D and 43A to 43D, respectively. The stages 41A,43A which receive filter response sequences on data paths 31,35 may comprise buffer stages as the sequences are multiplied by 1. The stages 41B,43B may comprise ones or twos complement circuits as they multiply the filter response sequences on the data paths 32,36 by $-1$. The stages 41C,43C multiply the filter response sequences on the data paths 33,37 by 0.7071 whilst the stages 41D,43D multiply the filter response sequences on the data paths 34,38 by $-0.7071$. Outputs from the respective stages of each of the multipliers are summed in respective adders 44,46. The outputs of the adders 44,46 are applied to the DACs 16,17 and the analogue outputs are frequency up-converted and summed before the result is applied to the antenna 28.

FIG. 6 illustrates another embodiment in which eight, or more specifically two groups of four, look-up tables 301 to 308 are connected in parallel to the stages of the shift registers SR1 to SR8. For convenience of illustration each shift register SR1 to SR8 is shown to have 8 outputs instead of 10 as shown in FIG. 5. The filter response sequences in each of the look-up tables 301 to 308 have already been weighted as required so that there is no requirement for the timing buffer and the multipliers 40,42 as shown in FIG. 5. During a symbol period the respective values of the I and Q filter response sequences are read out in parallel, summed in the adders 44,46,converted to analogue signals and the result applied to the mixers 18,20, respectively, for frequency up-conversion as described previously.

The present invention has been described with has been described with reference to $\pi/4$ DQPSK modulation but it can be applied to other modulation schemes.

From reading the present disclosure, other modifications will be apparent to persons skilled in the art. Such modifications may involve other features which are already known in the design, manufacture and use of transmitters, modulators and component parts thereof and which may be used instead of or in addition to features already described herein. Although claims have been formulated in this application to particular combinations of features, it should be understood that the scope of the disclosure of tile present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of transmitting data signals, comprising:
   differentially encoding the data signals to produce symbols corresponding to respective points of a differential encoding constellation,
   mapping said symbols as successive constellation points on a filter according to a truth table having columns representing each point on the differential encoding constellation, and having rows representing respective component values of constellation vectors, each constellation point being represented by a binary value at the respective intersection of a column and row,
   storing the binary values corresponding to the successive constellation points in a shift register,
   determining quadrature related weighted filter response sequences from the binary values corresponding to the successive constellation points,
   producing analog signals corresponding to the succession of weighted filter response sequences, and
   frequency up-converting the analog signals.

2. A method as claimed in claim 1, characterized in that the method includes $\pi/4$ DQPSK modulation.

3. A method of transmitting a digital signal, comprising:
   encoding successive bits as symbols,
   modulating said symbols,
   digitally filtering the modulated symbols according to a characteristic which produces a filter response sequence suitable for transmission,
   converting the filter response sequence to analog signals,
   frequency up-converting the analog signals, and
   transmitting the frequency up-converted analog signals,
   wherein the modulating step comprises:
   assigning the symbols to respective points of a modulation constellation using a truth table, each column of the truth table relating to a respective point of the constellation and each row of the truth table representing one of a plurality of possible in-phase and quadrature component values, the component values of each constellation point being indicated by a binary value at the respective intersections of a particular column with the rows, and
   storing the points of the modulation constellation as the in-phase and quadrature components of a vector defining each point, and
   wherein the digitally filtering step comprises:
   inputting the binary value of each row of the truth table into a respective shift register which has a predetermined plurality of stages corresponding to the number N of symbols,
   storing the filter response sequences for all combinations of N bits in a look-up table,
   using the outputs of the stages of the registers to form the input address to the look-up table,
   weighting the filter response sequences for all the in-phase components and for all the quadrature phase components, and obtaining the respective sums of the weighted filter response sequences, and
   applying analog signals corresponding to the respective sums of the weighted filter response sequences to a quadrature related frequency up-converter.

4. A method as claimed in claim 3, characterised in that the filter response sequences are weighted by having at least two look-up tables, the values stored in at least one of the look-up tables being the product of the filter response sequence and its weighting factor.

5. A method as claimed in claim 3, characterised in that the filter response sequences are weighted by applying the respective in-phase and quadrature filter response sequences to multiplying means for multiplication by a respective weighting factor.

6. A method as claimed in claim 5, characterized in that the method includes $\pi/4$ DQPSK modulation.

7. A method as claimed in claim 4, characterized in that the method includes $\pi/4$ DQPSK modulation.

8. A method as claimed in claim 3, characterized in that the method includes $\pi/4$ DQPSK modulation.

9. A transmitter for data signals, comprising:
   means for differentially encoding the data signals to produce symbols corresponding to respective points of a differential encoding constellation,
   a modulator comprising:
   a filter,
   means for mapping said symbols as successive constellation points on the filter according to a truth table having columns representing each point on the differential encoding constellation, and rows representing respective component values of constellation vectors, each constellation point being represented by a binary value at the respective intersection of a column and row,
   at least one shift register for storing the binary values corresponding to successive constellation points, and
   weighting means for determining quadrature related weighted filter response sequences from the binary values corresponding to the successive constellation points,
   means for producing analog signals corresponding to the succession of weighted filter response sequences, and
   a frequency up-converter receiving the analog signals.

10. A transmitter as claimed in claim 9, characterized in that the modulator is a $\pi/4$ DQPSK modulator.

11. A transmitter for a digital signal, comprising:
    an encoder for encoding successive bits of the digital signal as symbols,
    a modulator for modulating said symbols, comprising means for forming a truth table representing the components of vectors of a modulation constellation, the truth table having a respective column for each point of the constellation, and having a plurality of rows, each row being assigned a respective one of a plurality of possible in-phase and quadrature component values, the component values of each constellation point being indicated by a binary value at the respective intersections of a particular column with the rows,
    a filter comprising:
    a plurality of shift registers, equal in number to the number of rows in the truth table, for storing the points of the modulation constellation as the in-phase and quadrature components of a vector defining each point, each shift register having a predetermined plurality N of stages, means, responsive to receipt of a symbol, for storing an output from a corresponding row of the truth table into a respective shift register, at least one look-up table storing the filter response sequences for all combinations of N bits, means for using the outputs of each of the stages of the registers to form a respective input address to the look-up table, means for weighting the filter response sequences for all the in-phase components and for all the quadrature phase components, to form weighted filter response sequences, and means for forming the sum of the weighted filter response sequences for all the in-phase components, and forming the sum for all the quadrature components, a digital to analog converter for converting the respective sums of the weighted filter response sequences to respective analog signals, and a quadrature related frequency up-converter receiving the respective analog signals.

12. A transmitter as claimed in claim 11, comprising a plurality of the look-up tables, the filter response sequences in each table being weighted by the means for weighting by a respective weighting factor.

13. A transmitter as claimed in claim 11, characterized in that the modulator is a $\pi/4$ DQPSK modulator.

14. A transmitter as claimed in claim 11, characterized in that said means for weighting includes means for multiplying an output of the truth table by a weighting factor.

15. A transmitter as claimed in claim 14, characterized in that the modulator is a $\pi/4$ DQPSK modulator.

* * * * *